C. W. WYMAN.
LUBRICATING DEVICE.
APPLICATION FILED DEC. 7, 1916.
1,348,769.
Patented Aug. 3, 1920.
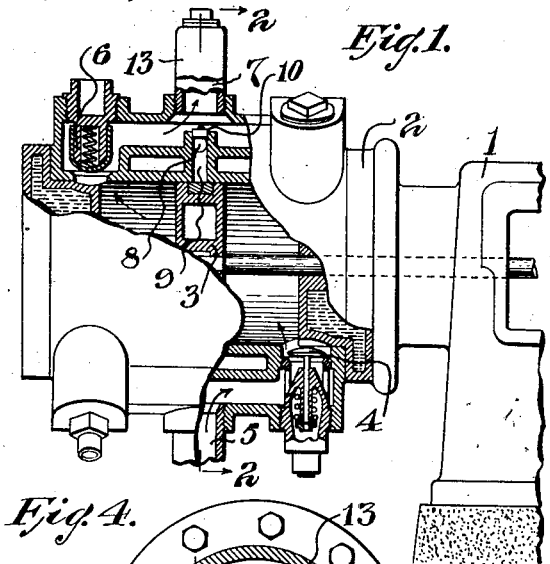
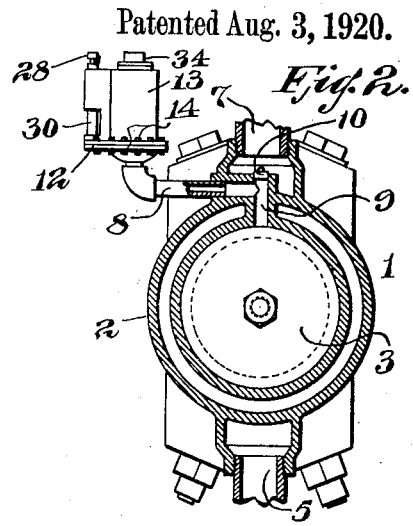
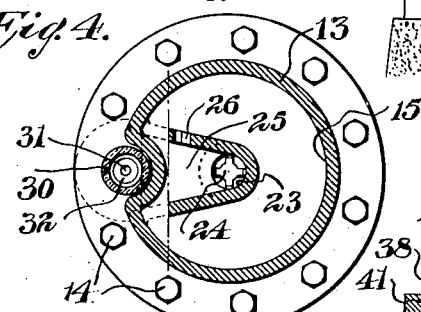
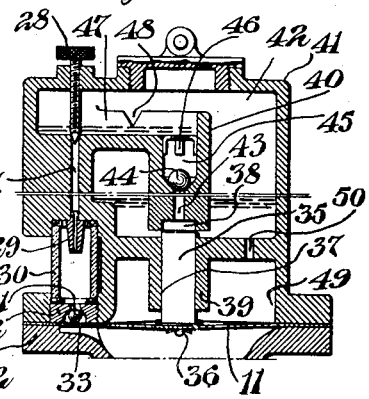
Inventor:
Charles W. Wyman

UNITED STATES PATENT OFFICE.

CHARLES W. WYMAN, OF CLAREMONT, NEW HAMPSHIRE, ASSIGNOR TO SULLIVAN MACHINERY COMPANY, A CORPORATION OF MASSACHUSETTS.

LUBRICATING DEVICE.

1,348,769.  Specification of Letters Patent.  Patented Aug. 3, 1920.

Application filed December 7, 1916. Serial No. 135,627.

*To all whom it may concern:*

Be it known that I, CHARLES W. WYMAN, a citizen of the United States, residing at Claremont, in the county of Sullivan and State of New Hampshire, have invented certain new and useful Improvements in Lubricating Devices, of which the following is a full, clear, and exact specification.

My invention relates to lubricating devices.

It has for its object to provide an improved lubricator adapted to use in connection with compressors, steam engines, or the like, whereby a movement of a part of the machine, as for instance a piston, is caused to pump lubricant from a suitable source of supply to the machine. A more specific object of my invention is to provide an improved lubricator especially adapted to use in compressors, steam engines, or the like, wherein the pressures during opposite strokes of the piston are utilized as a pumping agent acting upon a suitable source of lubricant supply to cause this lubricant to be supplied to the machine. A still further and more specific object of my invention is to provide improved means whereby a predetermined amount of lubricant is separated from the main reservoir and maintained constantly available for distribution to the parts to be lubricated during the operation of the device, and wherein when the machine is shut down this supply of lubricant only is allowed to pass to the parts to be lubricated. These and other objects of my improved construction will, however, hereinafter more fully appear.

In the accompanying drawings, I have, for purposes of illustration, shown several embodiments which my invention may assume in practice, illustrating the same as applied to a compressor, although it should be understood that the invention is not limited to use in that connection.

In these drawings,—

Figure 1 is a partial sectional view of the compressor equipped with my invention, certain portions of the cylinder being broken away to facilitate illustration.

Fig. 2 is a sectional view taken on line 2—2 of Fig. 1 with my lubricator shown in elevation.

Fig. 3 is a vertical sectional view through the lubricator *per se.*

Fig. 4 is a transverse sectional view taken on line 4—4 of Fig. 3.

Fig. 5 is a similar vertical sectional view showing a modified form of lubricator.

Fig. 6 is a similar sectional view showing a still further modified form of lubricator.

Fig. 7 is a vertical sectional view through a modified form of diaphragm operating mechanism.

Fig. 8 is a further modified form of the same mechanism.

In the first illustrative construction shown in Figs. 1 to 4 inclusive, I have shown a compressor 1, which may be of any desired construction, provided with a cylinder 2 in which moves the usual piston 3, the latter acting to draw in air through suitable inlet valves 4, only one of which is shown, from a suitable air inlet 5, and deliver the same through suitable discharge valves 6, only one of which is shown, to a suitable discharge line 7. As in the usual construction, the piston 3 as it moves in one direction, compresses the charge in one end of the cylinder at the same time that it draws air into the opposite end of the cylinder, this process being reversed when the piston moves in the opposite direction.

In my improved construction, I utilize the varying pressures thus developed in the cylinder by the movement of the piston, to pump lubricant to the parts to be lubricated. In Fig. 2 is shown one form of my lubricator in which a pipe 8 is connected to the cylinder at a point where the pressures therein are relatively low. As shown, this pipe is extended into a suitable passage 9 located at substantially the center line of the cylinder and plugged at one end at 10 and communicating through its opposite end with the cylinder. Upon the opposite end of this pipe 8 is carried the lubricator, in which it will be noted that a diaphragm 11 of any suitable form is carried on the bottom plate 12 and preferably between the latter and an upper reservoir casing 13, the diaphragm being held in position preferably by the same bolts 14 which clamp together the bottom plate 12 and casing 13 of the lubricator. This diaphragm is disposed directly across the path of the pressure which, as the piston moves back and forth, is transmitted through the pipe 8, and thus this diaphragm is directly responsive to the variations in pressure in the cylinder. Above this diaphragm 11 and in the casing 13, is formed a suitable lubricant reservoir 15 communicating with the diaphragm through a suitable bottom outlet 16 which is, in turn, controlled by a check valve 17 preferably in the form of a ball and normally resting on a suitable member or block 18 carried by the diaphragm. Thus, as the diaphragm 11 is moved up and down by the varying pressures in the cylinder, the lubricant in the reservoir 15 will successively pass down from the reservoir through the open valve 17 onto the top of the diaphragm as the latter moves to its down position, and be placed under pressure by the movement of the diaphragm and the closure of the valve 17 when the diaphragm is again raised by an increase of pressure within the compressor cylinder. Thus, a pumping action of the lubricant is made possible, and I avail of this action to pump the lubricant to a suitable supplemental reservoir. As shown, I provide an outlet 19 over the diaphragm, and a plurality of check valves preferably in the form of balls 20, 21 disposed in suitable seats formed in the mouths of preferably successively enlarged passages 22 and 23 which communicate with the passage 19. In passage 23 I place as suitable member 24 for limiting the movement of the balls constituting the check valves. Of these passages 22, 23, it will be noted that the passage 23 extends substantially to the top of the casing 13 and is there provided with a laterally extending enlarged or widened portion in the form of a supplemental reservoir preferably comprising a shallow dish 25 having an opening or V-shaped notch 26 in one of its edges adapted to permit anything more than a predetermined level of lubricant to flow back into the reservoir 15, preferably at a speed proportionate to its volume. As shown, a vertically disposed passage 27, controlled by an adjustable needle valve 28, communicates with the lubricant in this supplemental reservoir 25, and conducts lubricant down through a suitable funnel-shaped, drop forming mouth-piece 29 into a sight glass or tube 30. As shown, this glass 30 preferably has in its lower end a check valve, herein shown in the form of a ball 31 seated in a ball carrying ring 32 of usual construction, and disposed over a correspondingly smaller opening 33 in the diaphragm 11 in such a manner as to permit the flow of lubricant from the reservoir 25 to the pipe 8 and prevent the pressure in that pipe from passing upward into the glass 30. As is clearly shown in the drawings, the opening 33 through the diaphragm is so offset from directly below the center of the seat in the ball ring that the ball 31 cannot, when resting on the diaphragm, prevent the flow of lubricant through the opening 33. It will be obvious from the drawings that the ball 31 is fluid operated only, the portion of the diaphragm through which opening 33 passes being held rigid and also sealing the opening 33 against the flow of oil except from the reservoir 25. Obviously, the reservoir 15 may be filled by any suitable means, as through a suitable removable cover 34, and the needle valve 28 may be adjusted by any suitable means adjustable from the exterior of the casing 13.

In the operation of the device described, it will, of course, be evident that as the piston alternately reduces and builds up the pressure beneath the diaphragm 11, the latter will be alternately sucked down from its normal horizontal position in such a manner as to suck in oil from the main reservoir 15, and pushed up in such a manner as to eject that oil in slugs up through the valves 20 and 21, and up into the supplemental reservoir 25, the varying pressures in the cylinder thus acting as a pump tending to supply to that reservoir a constant flow of lubricant so long, and so long only, as the piston moves. Obviously, through the provision of the notch 26 and the valves 20, 21, a constant level will also be maintained in that reservoir, and only the supply in that reservoir will pass to the cylinder when the machine is shut down. Through the adjustment of the needle valve 28, the flow of lubricant from the reservoir 25 to the pipe 8 may also be regulated as desired, the flow being visible through the sight glass 30, so that the operator can regulate it as desired. Attention is also directed to the fact that by utilizing the pipe 8 disposed at the outer end of the cylinder as both a pressure and lubricant pipe, not only is the pressure relatively low, but the lubricant is returned to the cylinder at a point well adapted for efficient lubrication of the parts. It will also be noted that through the provision of the check valve 31, not only is the air entering through the pipe 8 prevented from blowing apart the drops of oil as they enter the sight glass and thus preventing the operator from determining whether or not the desired lubricant flow is maintained, but that this valve 31 also acts to prevent the pressure in the pipe 8 which acts upon the under side of the diaphragm 11, from impeding the free flow of the oil through the sight glass to the pipe 8, the valve 31 closing when the pressure is high and opening when the pressure falls, so that during these last mentioned intervals the oil will flow freely to the pipe 8 and be delivered by it to the piston at a point midway of the stroke of the latter.

In the form of my invention shown in Fig. 5, it will be noted that I have illustrated a plunger 35 fixed to the diaphragm 11, as by any suitable means 36, and moving through a suitable cylinder formed by cooperating bored out portions 37 and 38 in parts 39 and 40 of the casing casting 41. Of these members, it will be noted that the member 40 is disposed above the member 39 and surrounded by the lubricant in the reservoir 42 so that when the piston 35 moves downward with the diaphragm, some of the lubricant will flow in above the piston into the cylinder 38, and upon the upward stroke of the piston 35, be forced upward through a passage 43 and a check valve, herein shown in the form of a ball 44 carried in a suitable passage 45 and confined therein by a retainer 46, into a reservoir 47, corresponding to the reservoir 25 above described and likewise provided with a notched side 48. It will be obvious that as wear occurs in operation, the fit of the plunger 35 will become somewhat loose in its bore 37. Were the chamber 49 to be unprovided with a vent, leakage about plunger 35 would ultimately fill it and prevent operation of the diaphragm. I accordingly connect chamber 49 with reservoir 42 by a relatively large port 50 which permits the diaphragm to operate, chamber 49 being always full and oil surging freely back and forth through port 50 as the diaphragm moves. Inasmuch as the remainder of the mechanism including the needle valve, the sight glass, the check valve 31, etc., are the same as that described above in connection with the construction shown in Fig. 3, it seems unnecessary to repeat the description thereof.

In the form of my invention shown in Fig. 6, it will be noted that I have provided a valve 51 preferably having an upstanding stem 52, and normally held in closed position on a suitable preferably removable ring-like seat 53, by a spring 54 seated in a recess 55, which preferably forms a continuation of reduced cross section of a recess 56 in which the valve seat 53 is carried. In this construction, it will be noted that as the diaphragm 11 drops on a drop in pressure, the lubricant will be withdrawn from a reservoir 57 through a port 58, controlled by a ball valve 58', and when the diaphragm is next raised by an increase of pressure, will be forced up to open the valve 51 against the pressure of its spring, the valve 58' being now closed, so that the lubricant will be forced up through a reduced passage 59 and a check valve, herein shown in the form of a ball 60 limited in its movement by a stop 61, and into an upper reservoir 62 corresponding to the reservoir 25 above described. In this construction, it will also be noted that I have also provided a tube or other connection 63 having one end extending through the diaphragm and into communication with the pipe 8, while its other end preferably extends above the top of the reservoir 62, as shown. By the provision of this last mentioned connection, it will be noted that the pressure acting on the upper surface of the lubricant in the reservoir 62 always drags behind that acting on the under surface of the diaphragm 11 in such a manner as to produce very quickly the desired difference in pressure. It will be obvious that the relatively long and small-bored tube 63 may advantageously be used on the other forms of my invention.

In Fig. 7 I have illustrated a modification of the piston construction shown in Fig. 5. In this figure, it will be noted that the piston 35 is shown to be suitably fixed at 63ᵃ to a plate 64 resting on the diaphragm 11 and normally held against the latter by a coiled spring 65 extending around the portion 39 of the casing casting. In Fig. 8, I have also illustrated a modified form of the diaphragm pump shown in Fig. 3, illustrating in this construction a coiled spring 66 disposed around the outlet 19 in a suitable groove 67 formed in the bottom of the casing member 13, and having its opposite ends resting upon the bottom of the groove and the surface of the diaphragm 11. Obviously, in both of these constructions, the springs will act to assist the diaphragm to return to its normal position, and such a spring or other equivalent means may, if desired, be applied to use with a device embodying any form of my invention.

It will be obvious that the utility of my invention is not confined to single stage compressors, but that it may be used on any stage of multi-stage compressors.

By placing the lubricator near the center line of the cylinder, I obtain several material advantages. As is evident from the drawing, I use the one lubricator to lubricate the cylinder on both sides of the piston, thus saving 50 per cent. in cost of installation. Further, the rate of injection of the lubricant into the cylinder is independent of piston speed, and the sudden change in pressure from several pounds above atmospheric pressure to a partial vacuum, will insure a flow of oil when otherwise there would not be a flow because the pressure in the end of the cylinder drops slowly when the pressure generated is low or the piston is not reciprocated rapidly.

While I have in this application, specifically described several embodiments which my invention may assume in practice, it is to be understood that the invention may be still further modified and embodied in various other forms without departing from its spirit, it being my intention to include all such modifications within the scope of the appended claims.

What I claim as new and desire to secure by Letters Patent is:—

1. In combination, a cylinder, a piston therein, and lubricant feeding means alternately actuated by increase and decrease of pressure during each single stroke of said piston.

2. In combination, a cylinder, a piston therein, and lubricant feeding means alternately actuated by pressure and vacuum during each single stroke of said piston.

3. In combination, a cylinder, a piston movable therein, and lubricant feeding means actuated at each stroke of the piston by variations in pressure developed in a single stroke of said piston.

4. In combination, a cylinder, a piston therein, and lubricant feeding means operated through a complete cycle during each single stroke of said piston.

5. In combination, a cylinder, a piston therein, and a single, cylinder-pressure-operated lubricant feeding means operated to dispense lubricant to said cylinder at each stroke of said piston.

6. In combination, a cylinder, a piston therein, and lubricant feeding means comprising a pump operated through a complete cycle during each single stroke of said piston.

7. In combination, a cylinder, a piston therein, and a single lubricant feeding means operated by the pressures on opposite sides of the piston.

8. In combination, a cylinder, a piston therein, and lubricant feeding means alternately actuated by the changes of pressure in the cylinder during a single stroke of said piston.

9. In combination, a cylinder, a piston movable therein, and diaphragm actuated lubricant feeding means actuated by the variations in pressure developed during a single stroke of said piston.

10. In combination, a cylinder, a piston movable therein, and lubricant supplying means connected to said cylinder substantially midway between its ends and actuated by the varying pressures during each single stroke in said cylinder.

11. In combination, a cylinder, a piston movable therein, and lubricant supplying means connected to said cylinder remote from its ends and actuated by the varying pressures during a single stroke in said cylinder.

12. In a lubricating device, a cylinder, a piston movable therein, and lubricant supplying means including a pressure actuated lubricant pump and a single connection between the same and a point adjacent the center line of said cylinder.

13. In a lubricating device, a cylinder, a piston therein, and pressure actuated lubricant supplying means including a single alternately effective pressure supply and lubricant discharge member for supplying lubricant to both sides of said piston.

14. In a lubricating device, a cylinder, a piston therein, and pressure actuated lubricant supplying means including a single alternately effective pressure supply and lubricant discharge member connected to said cylinder for supplying lubricant to either side of said piston.

15. In a lubricating device, a cylinder, a piston therein, and pressure actuated lubricant supplying means including a single alternately effective pressure supply and lubricant discharge member connected adjacent the center line of said cylinder.

16. In a lubricating device, a cylinder, a piston movable therein, and means operatively connected to said cylinder at a point adjacent its center line for pumping lubricant by the variations in pressure in said cylinder as said piston moves back and forth including a diaphragm exposed at one side to the pressure in said cylinder.

17. In combination, a cylinder, a piston, and a lubricating device therefor comprising means for pumping lubricant by the variations in pressure in said cylinder during a stroke of said piston and including a diaphragm exposed at one side to the pressure in said cylinder.

18. In a lubricating device, a cylinder, a piston movable therein, and means operatively connected to said cylinder at a point adjacent its center line for pumping lubricant by the variations in pressure in said cylinder as said piston moves back and forth and including a diaphragm exposed at one side to the pressure in said cylinder and a source of lubricant supply communicable with the opposite side of said diaphragm.

19. In a lubricating device, a cylinder, a piston movable therein, a source of lubricant supply, a supplemental reservoir communicating with said cylinder, and means actuated by the variations in pressure in said cylinder for delivering lubricant from said source of supply to said supplemental reservoir.

20. In a lubricating device, a cylinder, a piston therein, a reservoir constituting a source of lubricant supply, a supplemental reservoir communicating with said cylinder, means for subjecting one of said reservoirs to cylinder pressure, and means actuated by the variations in pressure in said cylinder for delivering lubricant from said source of supply to said supplemental reservoir.

21. In a lubricating device, a cylinder, a piston therein, a reservoir constituting a source of lubricant supply, a supplemental reservoir communicating with said cylinder, means for subjecting each of said reservoirs to cylinder pressure, and means actuated by the variations in pressure in said cylinder for delivering lubricant from said source of supply to said supplemental reservoir.

22. In a lubricating device, a cylinder, a piston therein, a reservoir constituting a source of lubricant supply, a supplemental reservoir communicating with said cylinder, an elongated connection between said cylinder and the surfaces of said reservoirs, and means actuated by the variations in pressure in said cylinder for delivering lubricant from said source of supply to said supplemental reservoir.

23. In a lubricating device, a cylinder, a piston movable therein, a source of lubricant supply under fluid pressure, a supplemental reservoir, lubricant pumping means actuated by the variations in pressure in said cylinder for delivering lubricant from said source of supply to said supplemental reservoir, and means for maintaining a predetermined level in said supplemental reservoir.

24. In a lubricating device, a cylinder, a piston movable therein, a source of lubricant supply, a supplemental reservoir, and lubricant pumping means, actuated by the pressure variations in said cylinder during each single stroke of said piston, for delivering lubricant to said supplemental reservoir.

25. In a lubricating device, a cylinder, a piston movable therein, a source of lubricant supply, a supplemental reservoir having an outlet, means actuated by the variations in pressure in said cylinder for delivering lubricant from said source of supply to said supplemental reservoir, and connections between said supplemental reservoir and its outlet including a check valve.

26. In a lubricating device, a cylinder, a piston therein, a source of lubricant supply, a supplemental reservoir communicating with said cylinder, lubricant pumping means controlled by the variations in pressure in said cylinder for delivering lubricant from said source of supply to said supplemental reservoir, and means for maintaining the pressure in said supplemental reservoir different from that in said cylinder.

27. In a lubricating device, a cylinder, a piston movable therein, a source of lubricant supply, a supplemental reservoir having an outlet communicable with said cylinder, lubricant pumping means controlled by the variations in pressure in said cylinder for delivering lubricant from said source of supply to said supplemental reservoir, and a supplemental fluid pressure connection between said supplemental reservoir and said cylinder.

28. In a lubricating device, a cylinder, a piston movable therein, a source of lubricant supply, a supplemental reservoir, lubricant pumping means responsive to the variations in pressure in said cylinder for automatically pumping lubricant from said source of supply to said supplemental reservoir, and means for maintaining a predetermined flow of lubricant from said supplemental reservoir to said cylinder at intermittent periods.

29. In a lubricator, a lubricant reservoir, a diaphragm, means including a single supply passage whereby upon movement of said diaphragm lubricant is pumped out of said reservoir, a supplemental reservoir receiving the pumped lubricant, means for maintaining a predetermined level in said supplemental reservoir, and means for feeding the lubricant by gravity from said supplemental reservoir to said supply passage.

30. In a lubricator, a lubricant reservoir, a diaphragm having one side thereof communicating with the lubricant in said reservoir, a valve controlling the flow of lubricant thereto from said reservoir and controlled by the movement of said diaphragm, lubricant pumping means including a coöperating oppositely acting valve likewise controlled by the movement of said diaphragm, and a single means for supplying fluid for actuating said diaphragm and conducting away the lubricant.

31. In a lubricator, a lubricant reservoir, a diaphragm having one side thereof communicating with the lubricant in said reservoir, a valve controlling the flow of lubricant thereto from said reservoir opened by said diaphragm when the latter is moved in one direction, lubricant pumping means including a coöperating oppositely acting valve opened by said diaphragm when the latter is moved in the opposite direction, and a single means for supplying fluid for actuating said diaphragm and for subsequently conducting away the lubricant.

32. In a lubricator, a lubricant reservoir, a diaphragm, a valve arresting the flow of lubricant from said reservoir to one side of said diaphragm when said diaphragm is moved in one direction, coöperating lubricant supplying means, means leading to the opposite side of said diaphragm and including a coöperating valve opened when the diaphragm is so moved, and means for actuating said diaphragm.

33. In combination, a cylinder, a piston movable therein, and a lubricator comprising a lubricant reservoir, a diaphragm, a valve arresting the flow of lubricant thereto from said reservoir when said diaphragm is moved in one direction, coöperating lubricant supplying means, means including a coöperating valve opened when the diaphragm is so moved, and alternately effective pressure and lubricant, connections between said cylinder and said diaphragm.

34. In combination, a cylinder, a piston movable therein, a source of lubricant supply, a supplemental reservoir, means controlled by the variations in pressure in said cylinder for delivering lubricant from said source of supply to said supplemental reservoir, means for maintaining a predetermined level in said supplemental reservoir, and outlet connections for said supplemental reservoir, including a valve responsive to variations in pressure in said cylinder.

35. In combination, a cylinder, a piston movable therein, a source of lubricant supply, a supplemental reservoir, means including a connection to said cylinder responsive to the variations in pressure in said cylinder for automatically pumping lubricant from said source of supply to said supplemental reservoir, means for maintaining a predetermined quantity of lubricant in said supplemental reservoir, and gravity feed connections between said supplemental reservoir and the connections to said cylinder.

36. In combination, a cylinder, a piston movable therein, means for utilizing the variations in pressure in said cylinder as said piston moves back and forth to pump lubricant including a diaphragm exposed at one side to the pressure in said cylinder, a source of lubricant supply communicating with the opposite side of said diaphragm, means for maintaining a predetermined quantity of lubricant pumped by said diaphragm separate from said source of lubricant supply, and means for supplying the same to the first mentioned side of said diaphragm.

37. In combination, a cylinder, a piston movable therein, a source of lubricant supply, a supplemental reservoir, means including a connection to said cylinder responsive to the variations in pressure in said cylinder for automatically pumping lubricant from said source of supply to said supplemental reservoir, means for maintaining a predetermined quantity of lubricant in said supplemental reservoir, gravity feed connections between said supplemental reservoir and the connection to said cylinder, and a check valve in said last mentioned connections.

38. In combination, a cylinder, a piston movable therein, and a lubricator comprising a lubricant reservoir, a diaphragm having one side thereof exposed to the lubricant in said reservoir, a check valve limiting the flow of lubricant from said reservoir when the diaphragm is moved in one direction, means including a coöperating check valve opened by said lubricant when the diaphragm is so moved, connections between the center line of said cylinder and the opposite side of said diaphragm, and means whereby the lubricant pumped by said diaphragm is delivered to said last mentioned connections.

39. In combination, a cylinder, a piston therein, and lubricant feeding means operated by pressure variations within the cylinder, whose rate of discharge into said cylinder is independent of piston speed, said means having but one port opening into the cylinder.

40. In a lubricating device, a cylinder, a piston therein, and pressure actuated lubricant supply means including a single alternately effective pressure supply and lubricant discharge member whose rate of discharge into said cylinder is independent of piston speed.

41. In a lubricating device, a cylinder, a piston therein, a reservoir constituting a source of lubricant supply, a supplemental reservoir communicable with said cylinder, an attenuated connection between said cylinder and the surfaces of said reservoirs, and means actuated by the variations in pressure in said cylinder for delivering lubricant from said source of supply to said supplemental reservoir.

In testimony whereof I affix my signature.

CHARLES W. WYMAN.

It is hereby certified that in Letters Patent No. 1,348,769, granted August 3, 1920, upon the application of Charles W. Wyman, of Claremont, New Hampshire, for an improvement in "Lubricating Devices," errors appear in the printed specification requiring correction as follows: Page 4, line 43, claim 9, for the article "a" read *each;* page 5, line 123, claim 33, strike out the comma; and that the said Letters Patent should be read with these corrections therein that the same may conform to the record of the case in the Patent Office.

Signed and sealed this 14th day of September, A. D., 1920.

[SEAL.]

M. H. COULSTON,
*Acting Commissioner of Patents.*

Cl. 184—29.